Jan. 13, 1970 M. G. MOORE 3,489,034
EVACUATED GEAR CASING
Filed May 17, 1968
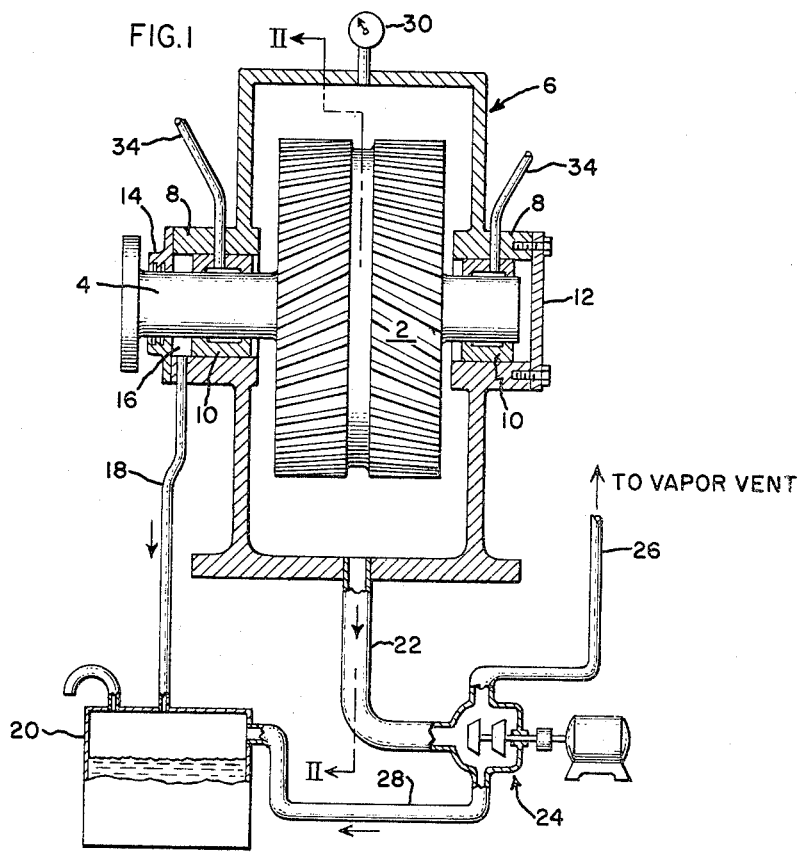
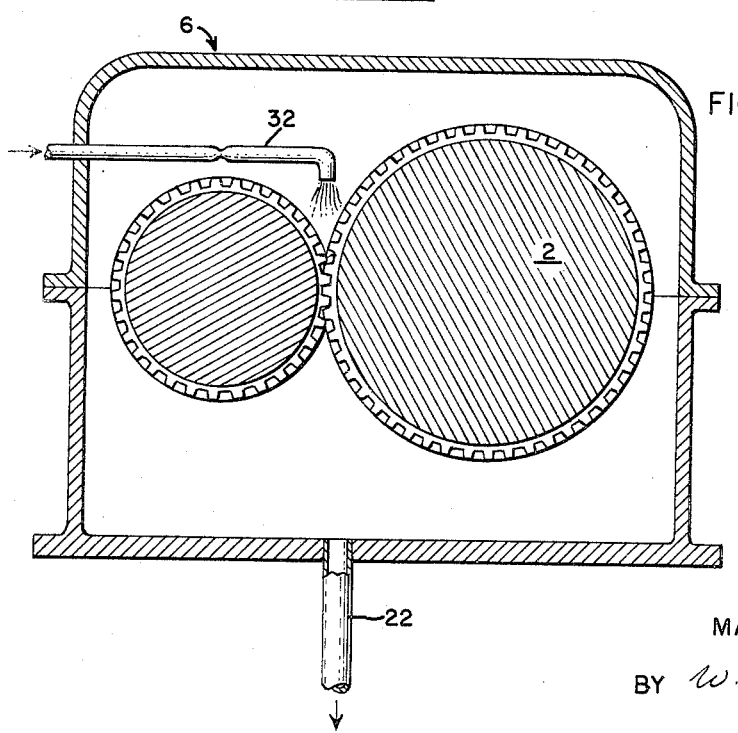
INVENTOR:
MARSHALL G. MOORE,
BY W. C. Crutcher
HIS ATTORNEY.

United States Patent Office 3,489,034
Patented Jan. 13, 1970

3,489,034
EVACUATED GEAR CASING
Marshall G. Moore, Danvers, Mass., assignor to General Electric Company, a corporation of New York
Filed May 17, 1968, Ser. No. 730,050
Int. Cl. F16h 57/02
U.S. Cl. 74—606                                                  1 Claim

ABSTRACT OF THE DISCLOSURE

A high speed gear train is disposed within an airtight gear casing. The casing is connected to a vacuum pump and to an oil reservoir. The vacuum pump maintains a vacuum within the casing which reduces gear train windage losses, thereby reducing the operating temperature of the train.

BACKGROUND OF THE INVENTION

The present invention is related to gear trains in general and more particularly to a high speed gear train operated within a closed casing.

The present invention will find application, for example, in such high speed gearing applications as the drive train between a turbine and a compressor. Due to the high speed of such gears, windage losses arise which produce heat and reduce efficiency. In addition to being a considerable loss of power, this heating is detrimental to the gear tooth surfaces in that it causes the oil film between meshing teeth to weaken and makes the gears more susceptible to scoring.

It is an object of the present invention to provide a high speed gear train having improved efficiency by reduction of windage power loss.

Another object is to provide a high speed gear train which operates in a relatively cool atmosphere, thereby reducing its susceptibility to scoring.

Other objects, advantages and features of the present invention will become apparent from the following description of one embodiment thereof when taken in connection with the accompanying drawings.

SUMMARY OF THE INVENTION

The present invention is practiced in one form by a high speed gear train disposed within a casing. The casing is closed to the atmosphere and a rotating seal is maintained with the bearing oil film. A vacuum is produced within the casing which reduces gear train windage losses, thereby reducing the operating temperature of the train.

DRAWING

In the drawing:
FIG. 1 is a side elevation, partly in section, of a gear and casing and associated equipment according to the present invention.
FIG. 2 is an axial elevation taken generally along the line II—II of FIG. 1.

DESCRIPTION

Referring now to FIG. 1, a high speed gear is shown at 2 mounted on a shaft 4 which is disposed within a casing generally indicated at 6. Casing 6 includes sleeves 8 mounted thereon for the accommodation of bearings 10 in which shaft 4 is rotatably mounted.

The bearings 10 are modified to serve as seals by arranging them so that annular oil films drain both directions through annular clearances around the shaft. The clearance on the gear side is made smaller than the clearance toward the atmosphere, to compensate for the pressure difference.

A coverplate 12 tightly encloses the bearing 10 at one end of the casing. At the opposite end of casing 6, shaft 4 extends through the casing. Disposed outward of the bearing 10 is a labyrinth seal shown at 14. Between seal 14 and bearing 10 is a lubricant drain chamber 16.

Drain chamber 16 communicates by way of a drain line 18 with an atmospheric oil reservoir 20. A vacuum line or pump suction line 22 communicates with the interior of casing 6 and also with the suction side of a vacuum pump 24. Vacuum pump 24 is connected to a suitable discharge line 26 for air or vapor and a liquid discharge line 28. Liquid discharge line 28 leads to atmospheric oil reservoir 20. Vacuum pump 24 might be any suitable vacuum pump of many known in the art. A vacuum pressure gauge 30 communicates with the interior of casing 6.

Referring now to FIG. 2, a gear train including gear 2 is shown mounted within casing 6. A suitable orificed pipe for the introduction of lubricating oil to the gear teeth is shown at 32. Pipes 34 are shown for introducing oil to bearings 10. Pipes 32 and 34 communicate with and receive oil from the atmospheric oil reservoir 20.

In operation, the atmosphere within casing 6 is evacuated by means of vacuum pump 24 to a level on the order of one-fourth to one-fifth atmosphere depending on the vapor pressure of the lubricating oil. The gears running in this vacuum operate with greatly reduced windage losses and therefore a smaller temperature rise in the gear train. The lower temperature of operation reduces the susceptibility of the gears to scoring. Lubricating oil from bearings 10 provides an oil film and flows either inboard to the casing, or outboard to drain chamber 16 from which it drains to oil reservoir 20. The oil film also acts as the vacuum seal.

By using the vacuum system, the increase in efficiency of a high speed gear train is on the order of 0.5 to 1.0 percent. Depending on the cost of fuel versus the capital cost of the above-described equipment, such an increase in efficiency means a potential reduction in cost.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claim.

What is claimed is:
1. A gear train disposed within a casing and having input and output shafts rotatably mounted relative to and extending through said casing, a bearing between each of said shafts and said casing, said bearings being operable to maintain an oil film between rotating and stationary parts where said rotating parts extend through said casing, each of said bearings including a drain chamber at the outboard end thereof to collect effluent lubricating oil from said bearing, an atmospheric pressure reservoir connected to the drain chamber, means to introduce lubricating oil from said reservoir to said gear train and said bearings, said casing communicating with the suction of a vacuum pump.

References Cited

UNITED STATES PATENTS

| | | | |
|---|---|---|---|
| 740,780 | 10/1903 | Richards | 74—606 XR |
| 908,529 | 1/1909 | Williams. | |
| 1,299,156 | 4/1919 | Fast. | |
| 1,878,729 | 9/1932 | Sykes | 74—606 XR |
| 2,892,362 | 6/1959 | Nicholas. | |
| 3,260,130 | 7/1966 | Pitts | 74—606 |
| 3,424,372 | 1/1969 | Blattner et al. | 74—606 XR |

FRED C. MATTERN, Jr., Primary Examiner
F. D. SHOEMAKER, Assistant Examiner